US012752401B1

(12) United States Patent
Schmidt

(10) Patent No.: US 12,752,401 B1
(45) Date of Patent: Oct. 6, 2026

(54) VISE ASSEMBLY WITH TWO MOVABLE JAWS

(71) Applicant: Kurt Manufacturing Company, Inc., Minneapolis, MN (US)

(72) Inventor: David L. Schmidt, Zimmerman, MN (US)

(73) Assignee: KURT MANUFACTURING COMPANY, INC., Minneapolis, MN (US)

(*) Notice: Subject to any disclaimer, the term of this patent is extended or adjusted under 35 U.S.C. 154(b) by 287 days.

(21) Appl. No.: 18/463,946

(22) Filed: Sep. 8, 2023

Related U.S. Application Data

(60) Provisional application No. 63/405,239, filed on Sep. 9, 2022.

(51) Int. Cl.
*B25B 1/00* (2006.01)
*B25B 1/02* (2006.01)
*B25B 1/10* (2006.01)

(52) U.S. Cl.
CPC . *B25B 1/10* (2013.01); *B25B 1/02* (2013.01)

(58) Field of Classification Search
CPC ..... B25B 1/103; B25B 1/2473; B25B 1/2478; B25B 1/2484
See application file for complete search history.

(56) References Cited

U.S. PATENT DOCUMENTS 1,811,299 A * 6/1931 Brockhaus, Jr. ........ B25B 1/103 82/138
4,043,547 A * 8/1977 Glomb .................... B25B 1/125 269/244
4,403,801 A 9/1983 Huff et al.
4,458,566 A 7/1984 Tajima
4,555,844 A 12/1985 Palfery et al.
4,599,759 A 7/1986 Price et al.
4,894,103 A 1/1990 Bailey
4,949,444 A 8/1990 Kojima et al.
5,149,072 A 9/1992 Sartorio et al.
5,186,593 A 2/1993 Tsukada et al.
(Continued)

FOREIGN PATENT DOCUMENTS

DE 102004029051 B3 7/2005
DE 102006003985 A1 7/2007
(Continued)

*Primary Examiner* — Lee D Wilson
(74) *Attorney, Agent, or Firm* — Steven M. Koehler; Westman, Champlin & Koehler, P.A.

(57) ABSTRACT

A vise assembly and a method for clamping a workpiece comprises a base. A pair of side walls extend from the base and have guideways. A pair of spaced apart jaw assemblies is disposed on the base, each jaw assembly being movable on the base. Each jaw assembly comprises a jaw support supporting a jaw nut on an elongated member. The elongated member is disposed between and parallel to the guideways. At least one jaw nut of one of the first and second jaw assemblies is adjustably fixable to the elongated member so as to define a first distance between the jaw assemblies. Each jaw support can be slidable on the elongated member. A drive member is coupled to each of the jaw supports and is configured to pull the jaw supports toward each other and decrease a spacing between the jaw assemblies so as to be less than the first distance.

20 Claims, 7 Drawing Sheets

(56) References Cited

U.S. PATENT DOCUMENTS

| | | | | |
|---|---|---|---|---|
| 5,256,128 | A | 10/1993 | Neumann | |
| 5,309,368 | A | 5/1994 | Chern | |
| 5,330,205 | A | 7/1994 | Norton | |
| 6,293,750 | B1 | 9/2001 | Cohen et al. | |
| 6,357,994 | B1 | 3/2002 | St. Onge | |
| 6,371,717 | B1 | 4/2002 | Grams et al. | |
| 6,516,935 | B1 | 2/2003 | McLennan | |
| 6,557,235 | B1 | 5/2003 | Katz | |
| 8,215,624 | B2 | 7/2012 | Tomioka et al. | |
| 9,004,476 | B2 * | 4/2015 | Schmidt | B25B 1/2463 269/282 |
| 9,351,569 | B1 | 5/2016 | Lucey et al. | |
| 9,352,451 | B1 * | 5/2016 | Warth | B25B 1/2468 |
| 9,656,395 | B2 | 5/2017 | Youngwerth et al. | |
| 10,981,282 | B2 | 4/2021 | Haruna | |
| 11,383,354 | B1 * | 7/2022 | Taylor | B25B 1/2478 |
| 11,787,014 | B2 * | 10/2023 | Chang | B25B 1/241 269/240 |
| 2002/0117380 | A1 | 8/2002 | Downs et al. | |
| 2010/0243501 | A1 | 9/2010 | Monti | |
| 2010/0282037 | A1 | 11/2010 | Fujimoto et al. | |
| 2013/0154293 | A1 | 6/2013 | De Koning | |
| 2013/0245823 | A1 | 9/2013 | Kimura et al. | |
| 2022/0305621 | A1 * | 9/2022 | Rushlander | B25B 1/10 |

FOREIGN PATENT DOCUMENTS

| | | | |
|---|---|---|---|
| FR | 2566635 | A1 | 1/1986 |
| FR | 2586908 | A1 | 3/1987 |
| JP | 2010076006 | A | 4/2010 |
| WO | 2010035655 | A1 | 4/2010 |
| WO | 2018235545 | A1 | 12/2018 |

* cited by examiner

VISE ASSEMBLY WITH TWO MOVABLE JAWS

CROSS-REFERENCE TO RELATED APPLICATION(S)

The present application is based on and claims the benefit of U.S. provisional patent application Ser. No. 63/405,239, filed Sep. 9, 2022, the content of which is hereby incorporated by reference in its entirety.

BACKGROUND

The discussion below is merely provided for general background information and is not intended to be used as the scope of the claim subject matter. The present disclosure relates to vises, and in one aspect to a vise that has two movable jaws mounted on a base. An actuator moves the jaws together or separates them to hold a workpiece.

SUMMARY

In a first aspect of the disclosure, a vise assembly comprises a base. A pair of side walls extend from the base and have guideways. A pair of spaced apart jaw assemblies is disposed on the base, each jaw assembly being movable on the base. Each jaw assembly comprises a jaw support, a threaded screw; and a jaw nut threaded upon the threaded screw.

In a second aspect of the disclosure, a vise assembly comprises a base. A pair of side walls extend from the base and have guideways. An elongated member is disposed between and parallel to the guideways. A pair of spaced apart jaw assemblies include a first jaw assembly and a second jaw assembly. Each jaw assembly is movable toward and away from each other on the base and include a jaw nut, wherein at least one jaw nut of one of the first and second jaw assemblies is adjustably fixable to the elongated member so as to define a first distance between the jaw assemblies, and a jaw support slidable on the elongated member and supporting the associated jaw nut. A drive member is coupled to each of the jaw supports and is configured to pull the jaw supports toward each other and decrease a spacing between the jaw assemblies so as to be less than the first distance.

Another aspect of the disclosure is a method for clamping a workpiece between a first jaw assembly and a second jaw assembly, each jaw assembly being movable toward and away from each other on a base, wherein a pair of side walls extend from the base and have guideways, and wherein an elongated member is disposed between and parallel to the guideways, and wherein each jaw assembly comprises a jaw nut and a jaw support supporting the jaw nut. The method comprises adjustably fixing at least one jaw nut of one of the first and second jaw assemblies to the elongated member so as to define a first distance between the jaw assemblies, and sliding the jaw supports on the elongated member toward each other to decrease a spacing between the jaw assemblies so as to be less than the first distance.

DETAILED DESCRIPTION OF ILLUSTRATIVE EMBODIMENTS

Figure 1:
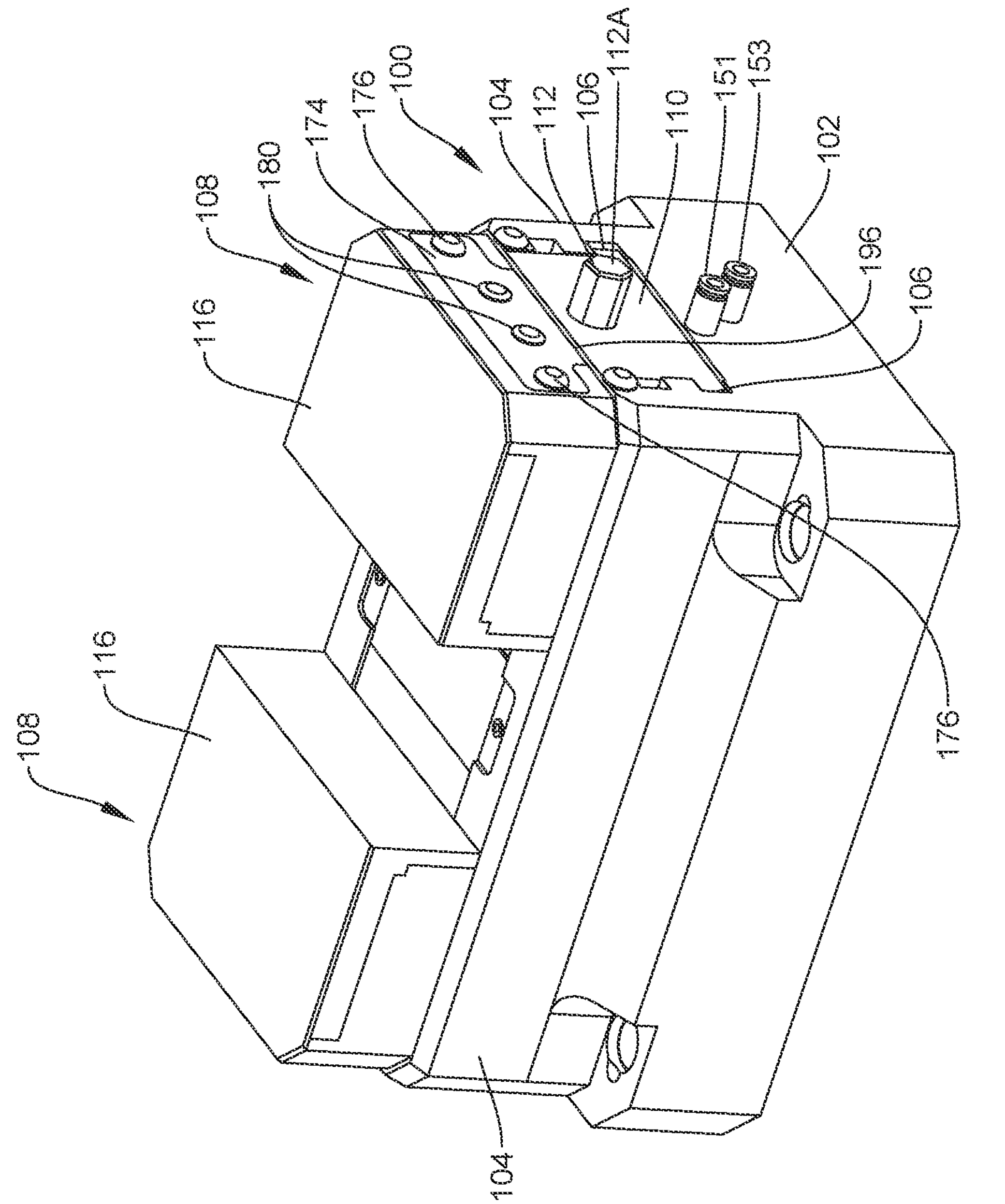
FIG. 1 is a perspective view of a vise.

A vise assembly 100 includes a base 102 and a pair of side walls 104 extending from the base 102 having guideways 106. Each of a pair of spaced apart jaw assemblies 108 is movable with respect to the base 102 and comprises a jaw support 110 supporting a jaw nut 114. An elongated member 103 is disposed between and parallel to the guideways 106. At least one jaw nut 114 of one of the jaw assemblies 108 is adjustably fixable to the elongated member 103 so as to define a first distance between the jaw assemblies 108, while each a jaw support 110 is slidable on the elongated member 103. A drive member 142 is coupled to each of the jaw supports 110 and configured to pull the jaw supports 110 toward each other and decrease a spacing between the jaw assemblies 108 so as to be less than the first distance.

The elongated member 103 can comprises threaded portions that mate with each jaw nut 114 allowing each nut to be adjustably fixed to the elongate member 103. In one embodiment, the elongate member 103 comprises a threaded screw 112 for each jaw nut 114 that in turn is rotatable in a fixed position on the corresponding jaw support 110.

Figure 5:
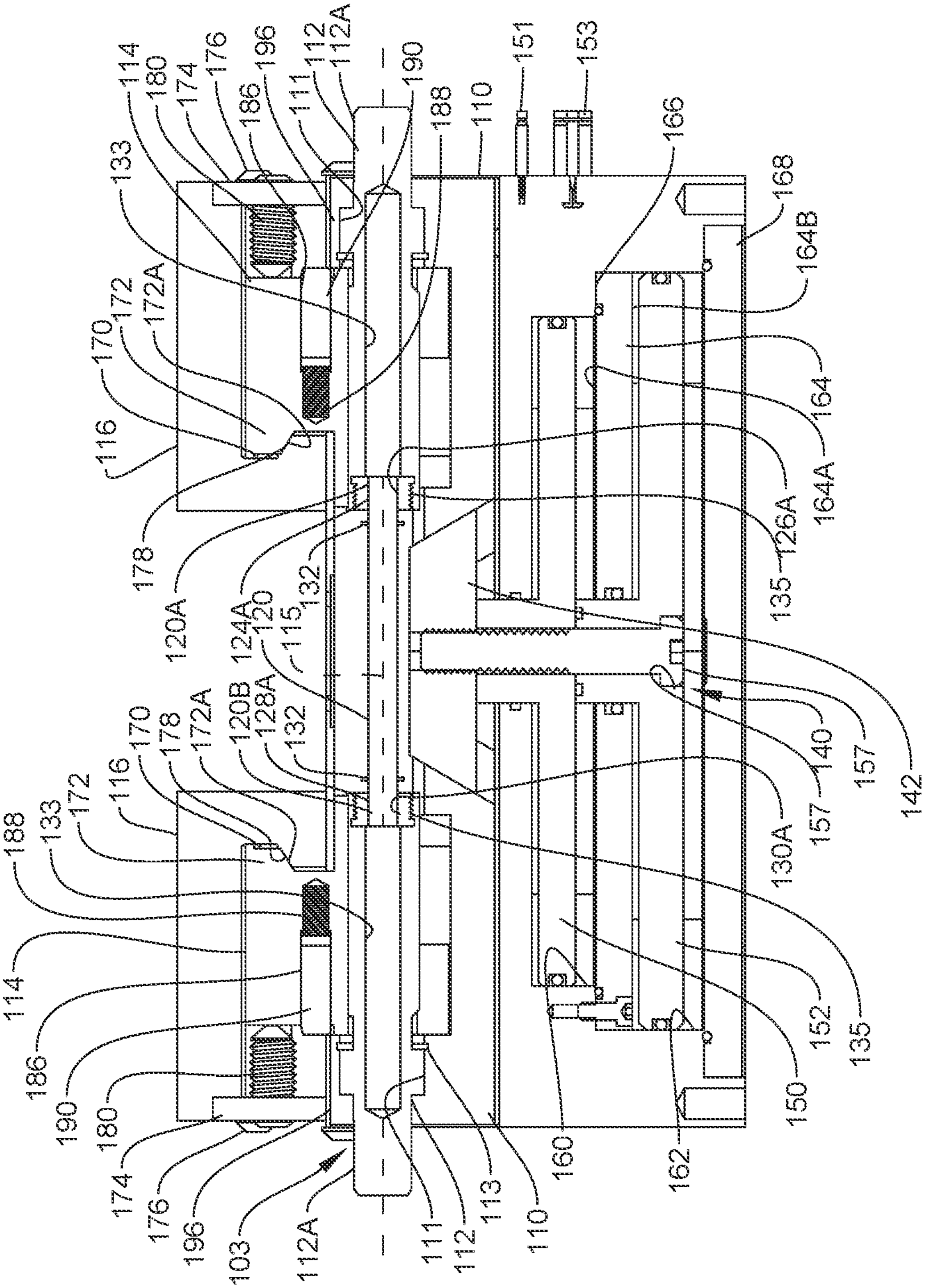
FIG. 5 is a sectional view of the vise in a first position.

Referring to FIG. 5, in the embodiment illustrated, each threaded screw 112 is received in a bore 111 with a portion 112A extending outwardly therefrom. A fastener 113, herein a spring washer or clip, retains the threaded screw 112 in the bore 111 allowing rotation therein. Preferably, the threaded screws 112 are coaxial with each other along a common axis 115. Due to the threaded connection of each threaded screw 112 with the corresponding jaw nut 114, the jaw nut 114 can be linearly displaced on the associated jaw support 110 with rotation of each corresponding threaded screw 112. A jaw plate 116 is secured to the jaw nut 114.

In one embodiment, the elongate member 103 further includes a coupler 120 that joins the threaded screws 112 together along the common axis 115. Preferably, the coupler 120 is axially slidable along the axis 115 with respect to at least one of the threaded screws 112. The coupler 120 includes a first set of surfaces 124A on a first end 120A of the coupler 120 mating with a first set of complimentary surfaces 126A on one of the threaded screws 112. A second set of surfaces 128A on a second end 120B of the coupler 120 mates with a second set of complimentary surfaces 130A on the other threaded screw 112.

A stop 132 on the coupler 120 limits sliding movement of the coupler 120 with respect to the at least one of the threaded screws 112. In the embodiment illustrated, the stop 132 comprises a projection extending above a surface of the coupler 120 such that the projection inhibits or limits movement of the coupler 120 in a bore 133 into which the coupler 120 could otherwise extend into. Preferably, the stop 132 is removably fixed to the coupler 120 so that the coupler 120 can be inserted further within the bore 133 during assembly of the vise assembly 100. When the coupler 120 is pulled out of the bore 133 so as to couple the coupler 120 to the other threaded screw, the stop 132 is then attached to the coupler 120.

In the embodiment illustrated, the coupler 120 is secured to an end of the threaded screws 112 using a set screw 135 (herein having the complimentary surfaces 126A) threadably mating with each end of the threaded screw 112. At least one of the set screws 135 has a bore through which the coupler 120 can extend into the bore 133 when needed. In the embodiment illustrated, each of the threaded screws 112 includes the bore 133 allowing the coupler 120 to extend into either of the threaded screws 112. A set screw 135 having an associated bore is also provided on the other threaded screw 112 and a stop 132 is also provided. It should be noted that the threaded screws 112 and the coupler 120 preferably are coaxial with each other on the common axis 115. In the embodiment illustrated, the stops 132 comprise C-shaped snap rings or clips although other devices such as set screws or the like can also be used.

With one of the threaded screws 112 having clockwise threads and the other having counter-clockwise threads with corresponding threads on each of the jaw nuts 114, at least one of the threaded screws 112 can be rotated so as to simultaneously rotate the coupler 120 and the other threaded screw 112. Simultaneous rotation of the thread screws 112 and the coupler 120 allows both of the jaw nuts 114 to simultaneously move on each corresponding jaw support 110 toward or away from each other and at the same rate when the thread pitch is the same on the threaded screws 112.

Figure 4:
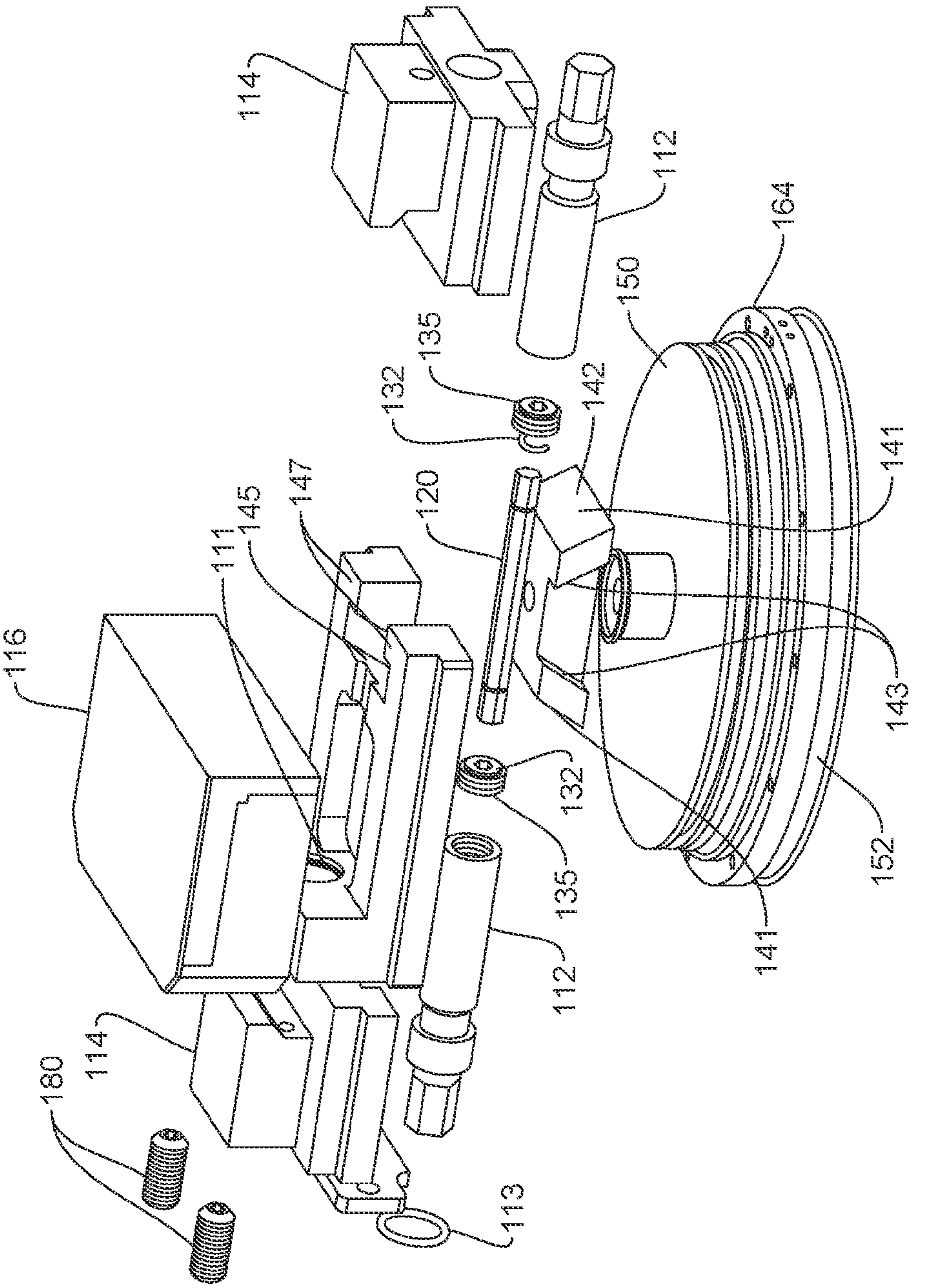
FIG. 4 is an enlarged exploded view of FIG. 3.

An actuator 140 can be provided and configured to drive the jaw supports 110 toward and away from each other. The actuator 140 includes a drive member 142 that has inclined surfaces 141 and 143 that slidably engage inclined surfaces 145 and 147 respectively of the jaw supports 112 (FIG. 4). The inclined surfaces 141 on the drive member 142 are on opposite ends, while the inclined surfaces 143 are also on opposite ends on each side of the drive member 142. Sliding engagement of surfaces 141 and 145 between the drive member 142 and each of the jaw supports 110 with movement of the drive member 142 upward in FIGS. 4-7 causes the jaw supports 110 to move away from each other, while sliding engagement of the surfaces 143 and 147 of the drive member 142 and the jaw supports 110 with movement of the drive member 142 in the opposite direction (downwardly) causes the jaw supports 110 to move toward each other.

The actuator 140 can operate using fluid pressure or be an electric actuator or solenoid. Generally, the actuator 140 includes a first portion coupled with the drive member 142 and a second portion that the first portion moves relative to thereto. In the embodiment illustrated, the actuator 140 comprises a fluid operated actuator having a piston 150 movable in a cylinder or chamber 160 formed in the body 102. Fluid pressure from a first port 151 that is fluidly coupled to the volume below the piston 150 with a passageway not shown in FIGS. 5-7 causes movement of the piston 150 and the drive member 142 to move upwardly so as to drive the jaw supports 110 away from each other. Similarly, fluid pressure provided to port 153 that is fluidly coupled to the volume above the piston 150 with a passageway not shown in FIGS. 5-7 causes the piston 150 and the drive member 142 there attached to move in the opposite direction downwardly thereby drawing the jaw supports 110 towards each other.

If desired, a second piston 152 can be coupled to piston 150 to move therewith and generate increased clamping forces. The second piston 152 is moveable in a second cylinder or chamber 162 in the base 102. A separator plate 164 having a first surface 164A that forms part of the first cylinder 160 and a second surface 164B, on a side opposite the first surface 164A, that forms part of the second cylinder 162. The first cylinder 160 and piston 150 can be smaller than the second cylinder 162 and second piston 152 so as to form an annular surface 166 upon which the separate plate 164 can be mounted. A cover plate 168 is secured to the base 102 to seal the lowermost cylinder or chamber provided in the base 102, herein cylinder or chamber 162.

The pistons 150,152 can be coupled to the drive member 142 with a fastener 157. If desired, the piston 152 is allowed to move slightly radially (translational) relative to a longitudinal axis of movement of the piston 152. In the embodiment illustrated, the fastener 157 secured to the drive member 142 has an enlarged head 157A that engages the piston 152, herein being disposed in a recess 152A formed in a second piston 152. The recess 152A is slightly larger than the head 157A of the fastener 157 such that the enlarged head 157A can move relative to the piston 152.

Figure 2:
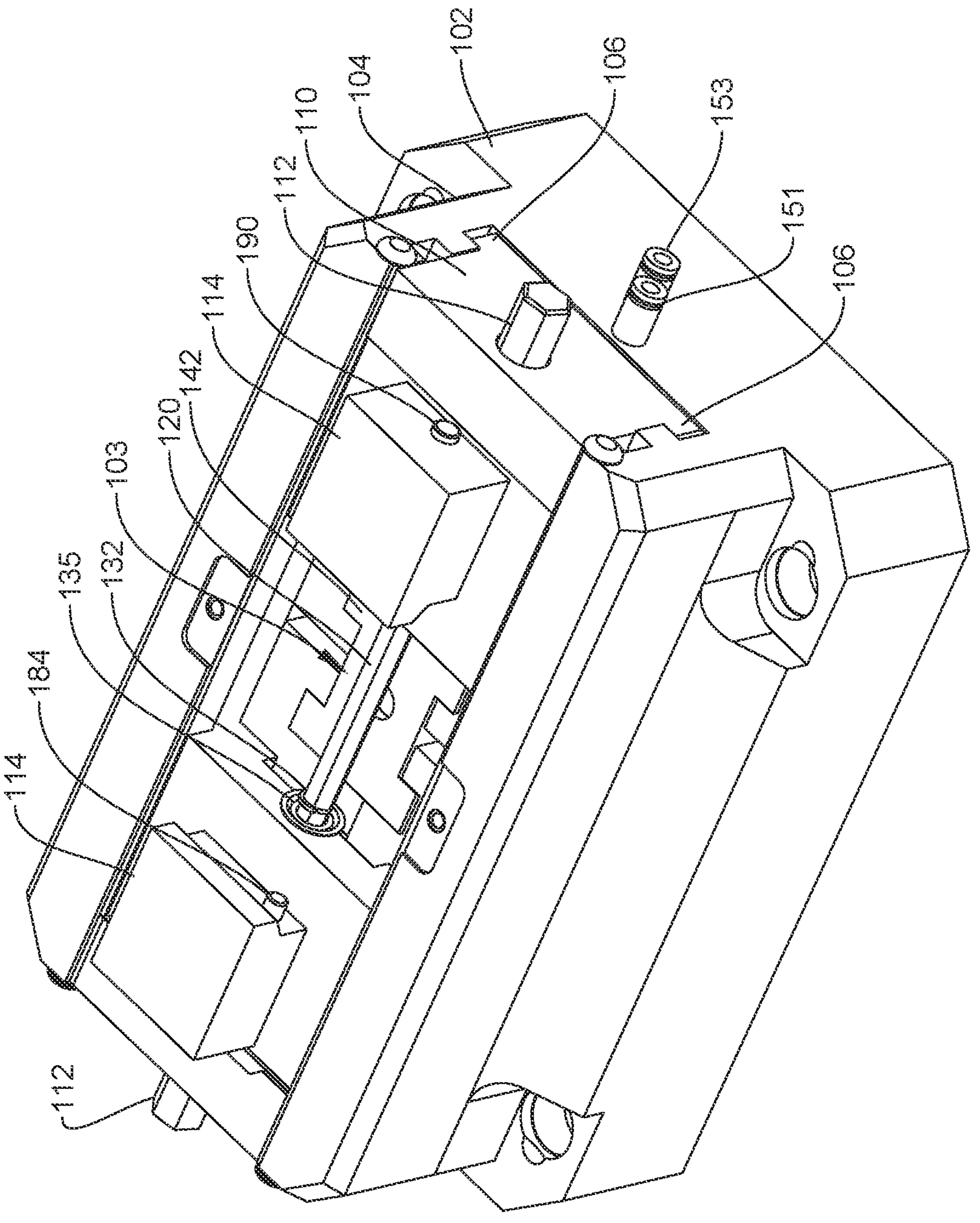
FIG. 2 is a perspective view of the vise with parts removed.
Figure 3:
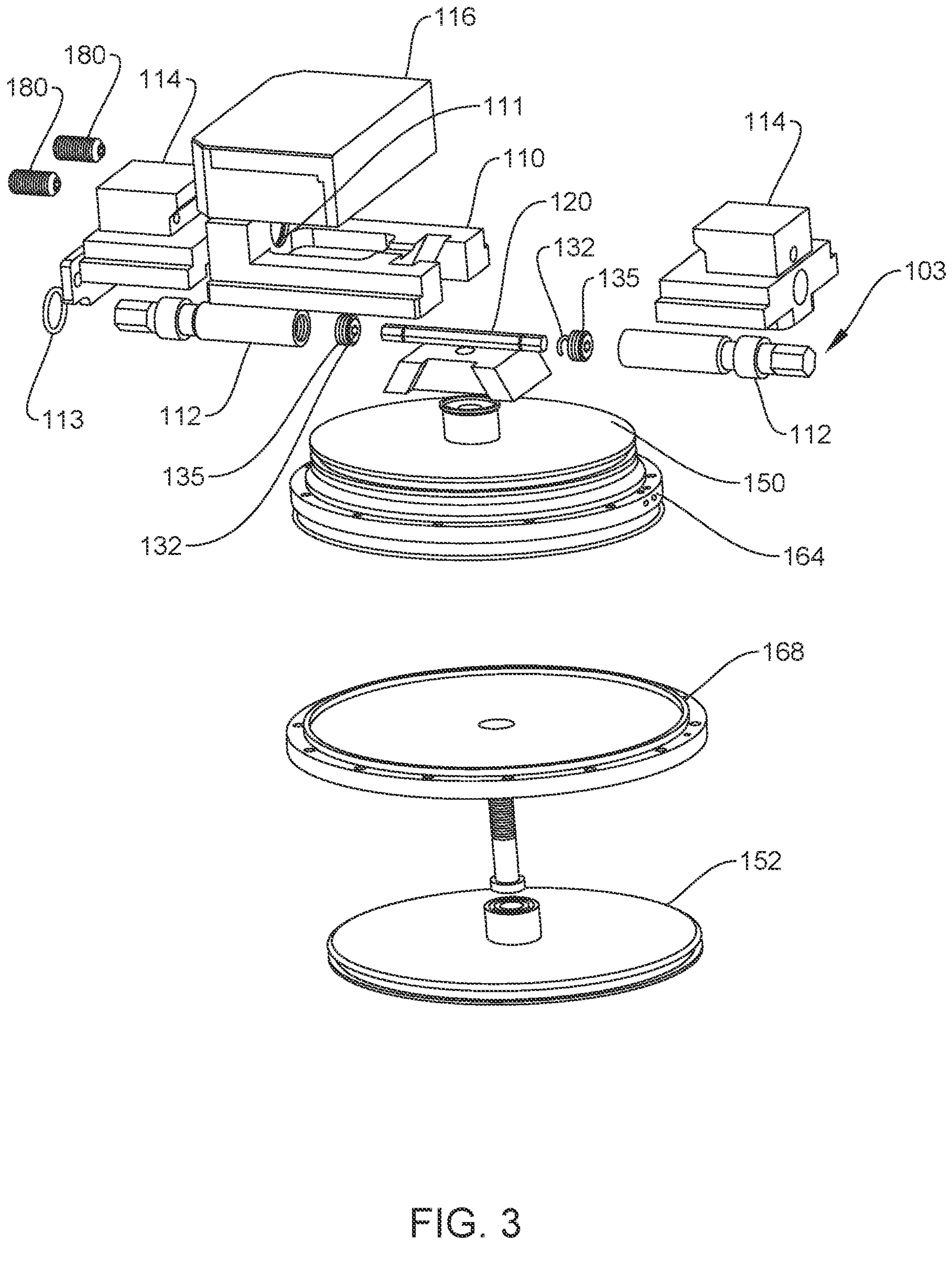
FIG. 3 is an exploded view of some parts of the vise.

Each of the jaw plates 116 can be secured to the corresponding jaw nut 114 in any suitable manner. In the embodiment illustrated in FIG. 5, each jaw plate 116 includes a recess 170 for receiving a jaw nut head 172 of each jaw nut 114. Referring also to FIG. 1, a cover plate 174 is attached with fasteners 176 to each jaw plate 116 to retain the jaw nut head 172 in each corresponding recess 170. The jaw nut heads 172 include an angle or inclined surface 172A that mates with a similarly inclined surface 178 with the jaw plates 116 so as to urge the clamping surfaces toward the upwardly facing surfaces of the corresponding jaw support 110. Set screws 180 secure the jaw plates 116 upon the jaw nut heads 172 retaining the surfaces 176 and 178 in engagement. A dowel 184 (FIG. 2) can be provided between each jaw nut 114 and the corresponding jaw plate 116 so as to obtain proper alignment of the jaw plate 116 on the jaw nut 114. Referring to FIGS. 1, 2 and 5, in the embodiment illustrated, a recess 186 is also provided in each jaw nut 114 and holds a spring 188 that biases a dowel 190 outwardly from the jaw nut 114. The dowel 190 engages a plate 196 on an upper surface of the base 102. Although the jaw support 110 moves relative to the base 102, the dowel 190 urges the plate 196 to stay in a fixed position so as to inhibit debris from entering into the recess between the sidewalls 104 and the base 102.

Figure 6:
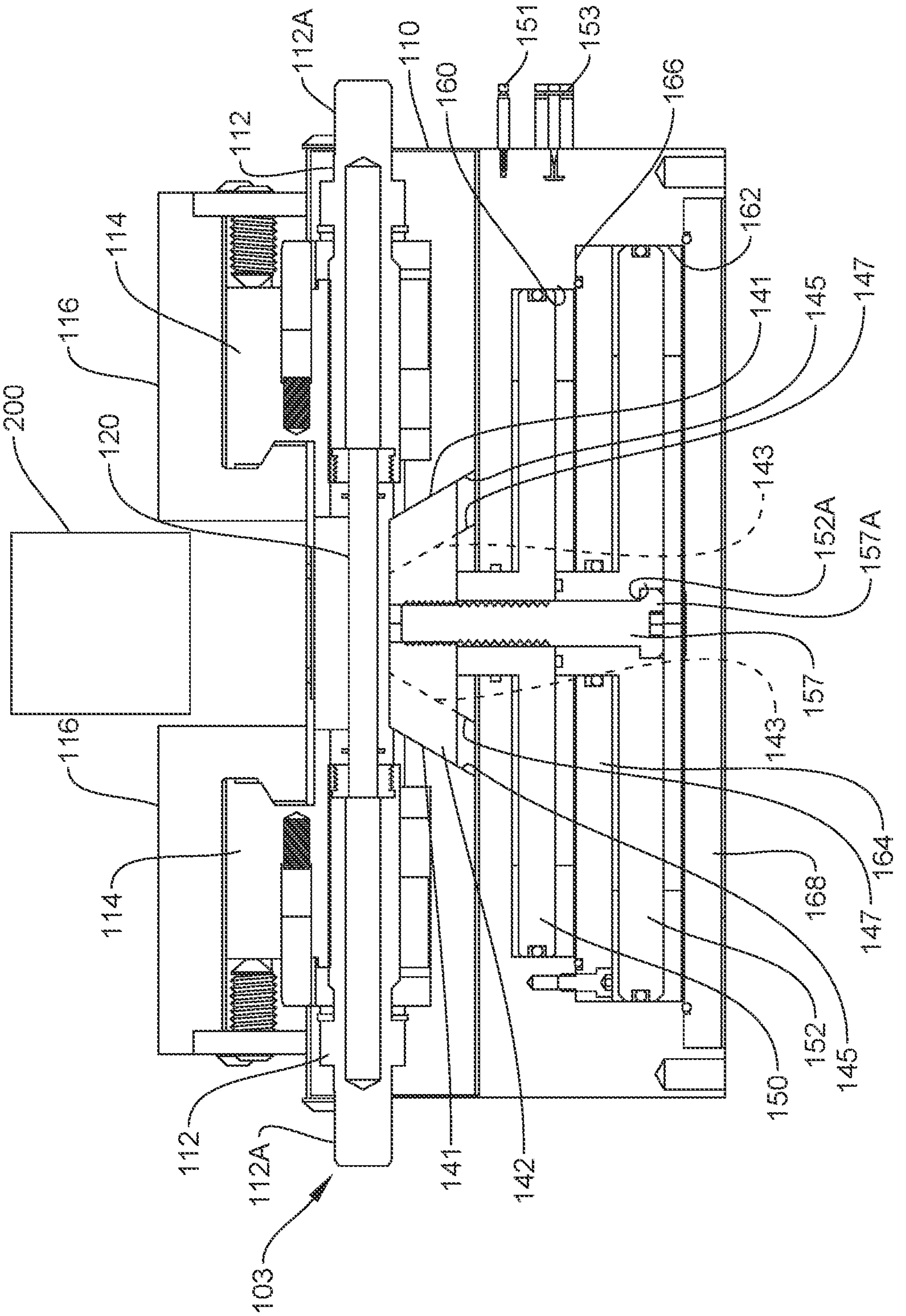
FIG. 6 is a sectional view of the vise in a second position.
Figure 7:
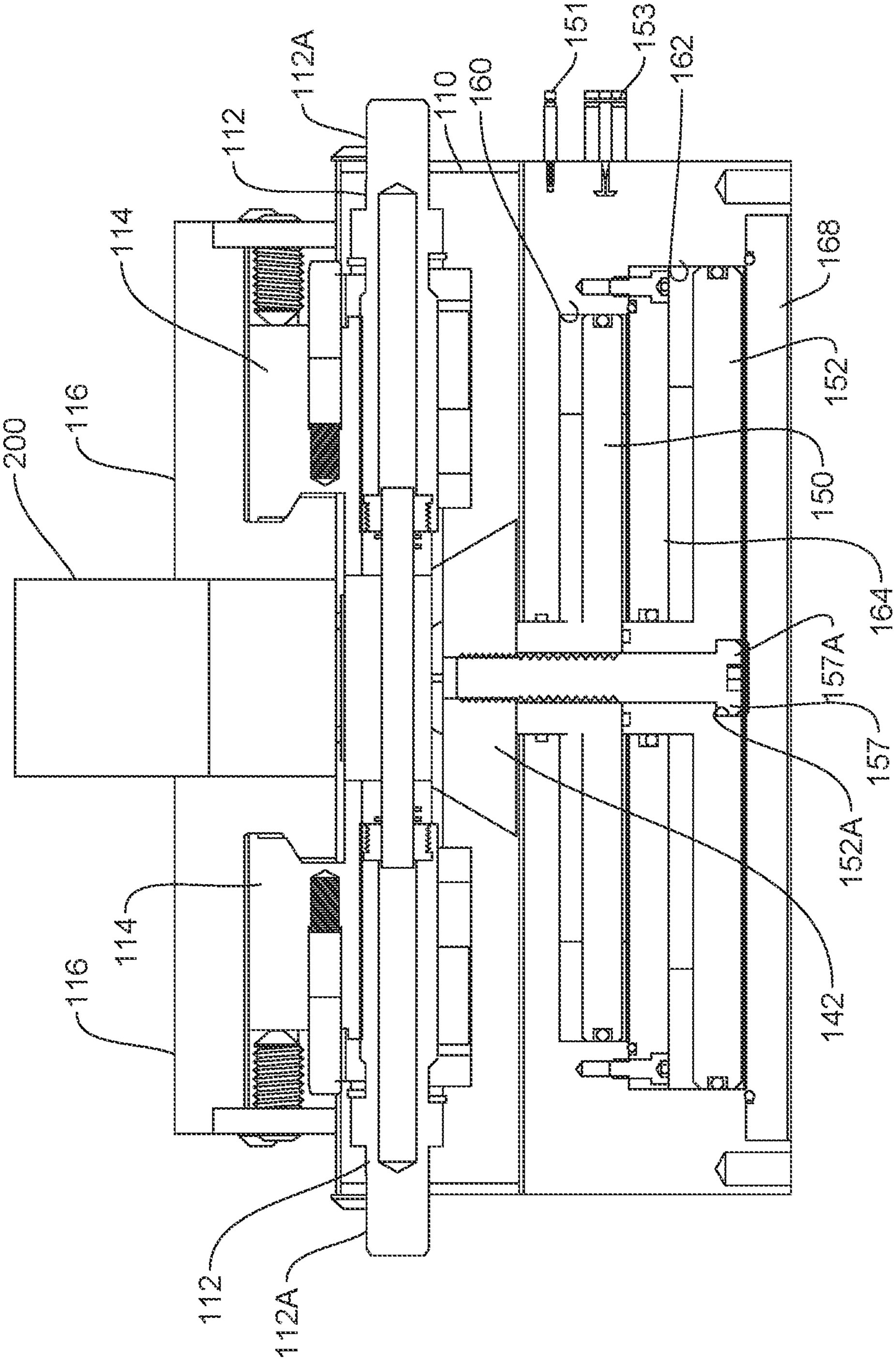
FIG. 7 is a sectional view of the vise in a third position.

Operation of the vise assembly 100 is illustrated in FIGS. 5-7. FIG. 5 illustrates the jaw assemblies 108 spaced apart from each other. From the positions of the jaw assemblies 108 in FIG. 5, one of the threaded screws 112 can be rotated using portion 112A so as rotate the coupler 120 and the other threaded screw 112 so as to displace each of the jaw nuts 114 on each corresponding jaw support 110. In the embodiment illustrated, the threaded screws 112 and coupler 120 are rotated so as to bring the jaw nuts 114 and associated jaw plates 116 closer to each other as illustrated in FIG. 6. FIG. 6 also illustrates a workpiece 200 to be clamped between the jaw plates 116. The overall spacing between the jaw plates 116 is slightly larger than the width of the workpiece 200 so as to allow it to be easily inserted between the jaw plates 116. However, the spacing is chosen so as to be less than the combined travel of each of the jaw nuts 114 on the associated jaw support 110 when the piston(s) 150,152 displace the drive member 142 so as to drive the jaw supports 110 toward each other. Clamping of the workpiece 200 is illustrated in FIG. 7. Note the threaded screws 112 have not engaged the stops 132 so the clamping forces are exerted on the workpiece 200. Movement of the piston(s) 150,152 in the opposite direction drives the jaw supports 110 and jaw nuts 114 and jaw plates 116 there attached back to the position illustrated in FIG. 6 so as to allow the workpiece 200 to be removed.

Although the present invention has been described with reference to preferred embodiments, workers skilled in the art will recognize that changes may be made in form and detail without departing from the spirit and scope of the invention.

What is claimed is:

1. A vise assembly comprising:

a base;

a pair of side walls extending from the base having guideways; and a pair of spaced apart jaw assemblies, each jaw assembly being movable on the base and comprising:

a jaw support;

a threaded screw rotatably supported on the jaw support and moveable therewith relative to the base; and a jaw nut threaded upon the threaded screw and movable relative to the jaw support with rotation of the threaded screw.

2. The vise assembly of claim 1 wherein the threaded screws are co-axial with each other.

3. The vise assembly of claim 2 wherein the threaded screws are rotatable in a fixed position on the jaw support.

4. The vise assembly of claim 1 wherein one of the threaded screws comprise clockwise threads and the other threaded screw comprises counterclockwise threads.

5. The vise assembly of claim 1 and a coupler joining the threaded screws together along a common axis.

6. The vise assembly of claim 5 wherein the coupler is slidable with respect to at least one of the threaded screws.

7. The vise assembly of claim 6 wherein the coupler comprises:

a first set of surfaces on a first end of the coupler mating with a first set of complimentary surfaces on one of the threaded screws; and a second set of surfaces on a second end of the coupler mating with a second set of complimentary surfaces on the other threaded screw.

8. The vise assembly of claim 7 and further comprising a stop limiting sliding movement between the coupler and said at least one of the threaded screws.

9. The vise assembly of claim 8 wherein said at least one of the threaded screws includes a bore along an axis of the coupler to receive the coupler at least partially.

10. The vise assembly of claim 6 wherein said at least one of the threaded screws includes a bore along an axis of the coupler to receive the coupler at least partially.

11. The vise assembly of claim 6 and an actuator configured to drive the jaw supports toward and away from each other.

12. The vise assembly of claim 11 wherein the actuator is configured to drive the jaw supports simultaneously toward and away from each other.

13. The vise assembly of claim 12 wherein the actuator comprises a drive member slidably coupled to each of the jaw supports.

14. The vise assembly of claim 13 wherein the actuator comprises a piston coupled to the drive member.

15. The vise assembly of claim 14 wherein the actuator comprises a second piston coupled to piston to move therewith.

16. The vise assembly of claim 15 wherein the piston is movable in a first cylinder in the base and the second piston is movable in a second cylinder in the base.

17. The vise assembly of claim 16 and further comprising a separator plate having a first surface forming part of the first cylinder and a second surface, on a side opposite the first surface, forming part of the second cylinder.

18. A vise assembly comprising:

a base;

a pair of side walls extending from the base having guideways;

an elongated member disposed between and parallel to the guideways; and a pair of spaced apart jaw assemblies comprising a first jaw assembly and a second jaw assembly, each jaw assembly being movable toward and away from each other on the base and comprising:

a jaw nut, wherein at least one jaw nut of one of the first and second jaw assemblies is adjustably fixable to the elongated member so as to define a first distance between the jaw assemblies; and a jaw support slidably supporting a portion of the elongated member and supporting the jaw nut; and an actuator having a drive member slidably coupled to each of the jaw supports with engaging planar surfaces configured to pull the jaw supports axially toward each other and decrease a spacing between the jaw assemblies so as to be less than the first distance.

19. The vise of claim 18, wherein the elongated member comprises:

a first elongate portion adjustably fixable to the jaw nut of the first jaw assembly;

a second elongate portion adjustably fixable to the jaw nut of the second jaw assembly; and a coupler coupling the first elongate portion to the second coupling portion along a common axis.

20. A method for clamping a workpiece between a first jaw assembly and a second jaw assembly, each jaw assembly being movable toward and away from each other on a base, wherein a pair of side walls extend from the base and have guideways, and wherein an elongated member is disposed between and parallel to the guideways, and wherein each jaw assembly comprises a jaw nut and a jaw support supporting the jaw nut and slidably supporting a portion of the elongated member, the elongated member comprising axially slidable members, the method comprising:

adjustably fixing at least one jaw nut of one of the first and second jaw assemblies to the elongated member so as to define a first distance between the jaw assemblies; and axially sliding the jaw supports toward each other to decrease a spacing between the jaw assemblies so as to be less than the first distance and axially slide the slidable members of elongated member relative to each other.

* * * * *